United States Patent [19]

Umezawa et al.

[11] 3,929,761

[45] Dec. 30, 1975

[54] 3-DEOXYKANAMYCIN

[75] Inventors: Sumio Umezawa; Hamao Umezawa, both of Tokyo; Tsutomu Tsuchiya, Yokohama, all of Japan

[73] Assignee: Zaidan Hojin Biseibutsu Kagaku Kenkyu Kai, Tokyo, Japan

[22] Filed: Mar. 11, 1974

[21] Appl. No.: 449,991

Related U.S. Application Data

[63] Continuation-in-part of Ser. No. 203,454, Nov. 30, 1971, abandoned.

[52] U.S. Cl............................ 260/210 K; 424/180
[51] Int. Cl.²......................................... C07H 15/22
[58] Field of Search................... 260/210 AB, 210 K

[56] References Cited
UNITED STATES PATENTS

| | | | |
|---|---|---|---|
| 3,356,674 | 12/1967 | Ikeda et al. | 260/210 R |
| 3,784,541 | 1/1974 | Culbertson et al. | 260/210 AB |

*Primary Examiner*—Johnnie R. Brown
*Attorney, Agent, or Firm*—Brady, O'Boyle & Gates

[57] ABSTRACT

3'-deoxykanamycin as a new and useful kanamycin derivative which is effective even against kanamycin-resistant strains of gram-positive and gram-negative bacteria, and a process of synthetizing 3'-dioxykanamycin from kanamycin.

1 Claim, No Drawings

3-DEOXYKANAMYCIN

This application is a continuation-in-part of copending application Ser. No. 203,454, filed Nov. 30, 1971, now abandoned.

This invention relates to a new and useful compound, 3'-deoxykanamycin which is useful in the therapeutic treatment of infections by gram-negative and gram-positive bacteria, including drug-resistant bacteria. This invention further relates to a process for the production of the 3'-deoxykanamycin.

Kanamycins are well known aminoglycosidic antibiotics, and in particular hanamycin A has widely been used as a valuable, chemotherapeutic agent, but unfortunately some kanamycin-resistant strains of bacteria which are resistant to kanamycins have occurred in recent years. In this situation, the mechanism of resistance of these drug-resistant bacteria to the known aminoglycosidic antibiotics has been studied. For instance, one of the present inventors, H. Umezawa et al have found that some strains of gram-negative bacteria carrying R factor, Staphylococcus aureus and Pseudomonas aeruginosa isolated from patients are resistant to kanamycins and that these kanamycin-resistant strains have the mechanism of resistance that they produce an enzyme capable of phosphorylating the 3'-hydroxyl group of kanamycins and inactivate the kanamycins under the action of the phosphotransferase (see the "Science" Vol. 157, page 1559 (1967)).

Based on this finding, we expect that the 3'-deoxylation of kanamycin A (hereinafter merely called kanamycin), that is, the replacement of the 3'-hydroxyl group of the kanamycin molecule by a hydrogen atom will prevent the kanamycin from being inactivated by the action of the phosphotransferase which is produced by the kanamycin-resistant bacteria, and that the 3'-deoxylation of kanamycin will thus give the kanamycin a new and useful activity to inhibit the growth of the kanamycin-resistant bacteria.

An object of this invention is to provide a new and useful derivative of kanamycin which has an effective antibacterial activity not only against the gram-positive and gram-negative bacterial but also against the kanamycin-resistant bacteria. A particular object of this invention is to provide 3'-deoxykanamycin as such a new and useful kanamycin derivatives which has useful antibacterial activity as stated above. The other object of this invention is to provide a process of producing the 3'-deoxykanamycin which may be carried out in a facile way. Another objects of this invention will be clear from the following descriptions.

Kanamycin has the following formula:

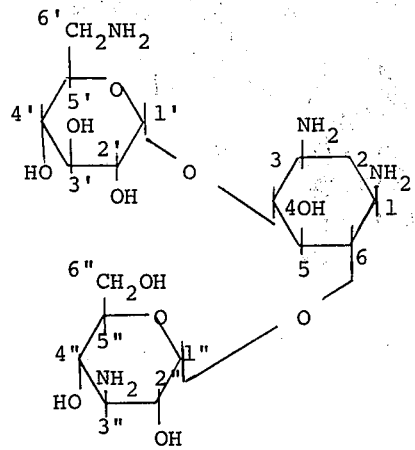

From the above formula, it is seen that kanamycin is one of polyamino-polyol compounds of which chemical structure is somewhat complicated, and we have found it very difficult to remove selectively by chemical reactions only the 3'-hydroxyl group from the kanamycin molecule which contains many functional hydroxyl groups and many functional amino groups therein. As a result of our research, we have now found that 3'-deoxykanamycin is synthetized in a relatively facile way by condensing a suitably amino- and hydroxyl-protected derivative of 6-O-(3-amino-3-deoxy-α-D-glucopyranosyl)-2-deoxystreptamine with such a suitably hydroxyl-protected 6-substituted-3,6-dideoxy-D-glucopyranosyl halogenide in which the 6-substituent is convertible into amino group $-NH_2$; converting the 6-substituent of the resultant condensation product into the amino group; and removing the residual amino- and hydroxyl-protecting groups from the condensation product to afford the 3'-deoxykanamycin.

According to the first aspect of the present invention, therefore, there is provided 3'-deoxykanamycin of the formula:

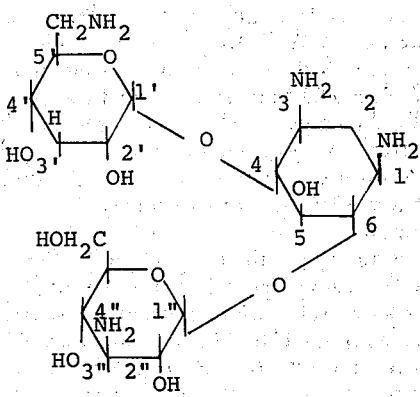

3'-Deoxykanamycin is a colorless crystalline powder which is soluble in water. $[\alpha]_D^{20} +146°$ (c 0.2, water). The minimal concentrations of 3'-deoxykanamycin inhibitory to the growth of various bacteria were determined and are shown in Table 1 below, together with those of kanamycin for the comparison purpose.

TABLE 1

Antibacterial spectra of 3'-deoxykanamycin and kanamycin

| Test organisms | Minimal inhibitory concentration (mcg/ml) | |
|---|---|---|
| | 3'-Deoxy-kanamycin | Kanamycin |
| Staphylococcus aureus FDA 209P | 1.56 | 1.56 |
| Escherichia coli NIHJ | 3.12 | 1.56 |
| Escherichia coli K-12 CS-2 | 3.12 | 1.56 |
| Escherichia coli K-12 ML 1629* | 3.12 | >50 |
| Escherichia coli K-12 ML 1630* | 3.12 | >50 |
| Escherichia coli K-12 ML 1410 | 3.12 | 0.78 |
| Salmonella typhosa T-63 | 0.78 | 0.39 |
| Pseudomonas aeruginosa A3 | 3.12 | 50 |
| Pseudomonas aeruginosa No. 11 | 12.5 | >50 |
| Pseudomonas aeruginosa No. 12 | 12.5 | 50 |
| Pseudomonas aeruginosa No. 39 | 12.5 | >50 |
| Pseudomonas aeruginosa No. 45* | 1.56 | 50 |
| Pseudomonas aeruginosa No. 67 | 12.5 | >50 |
| Proteus rettgeri GN311 | 12.5 | 6.25 |
| Proteus rettgeri GN466 | 6.25 | 3.12 |

In the above table, the mark * denotes the strain isolated from patients.

The minimal inhibitory concentrations mentioned above were measured according to usual serial dilution method using nutrient agar as the incubation medium at an incubation temperature of 37°C and after an incubation duration of 18 hours. From the above table, it is seen that the synthesized 3'-deoxykanamycin inhibits the growth of many kinds of bacterial strains in an order comparable to kanamycin and that the 3'-deoxykanamycin inhibits the growth of the strains of kanamycin-resistant *Staphylococcus*, kanamycin-resistant *Escherichia coli* and resistant *Pseudomonas aeruginosa*. 3'-Deoxykanamycin inhibits the infections caused by *Staphylococcus*, *Bacillus pneumoniae*, *Salmonella typhosa* and *Pseudomonas aeruginosa* in mice. 3'-Deoxykanamycin shows a low toxicity ($LD_{50} > 200$ mg/kg mouse, iv.) and high blood level concentration after its intravenous injection, thus proving that this new kanamycin derivative be a valuable chemotherapeutic for the treatment of many kinds of infections, including those caused by gram-negative and gram-positive resistant bacteria.

3'-Deoxykanamycin may readily be converted into a form of a pharmacutically acceptable acid-addition salt such as the hydrochloride, sulfate, phosphate, acetate, maleate, fumarate, succinate, tartarate, oxalate, citrate, methanesulfonate, ethanesulfonate and the like, by reacting the free base form of 3'-deoxykanamycin with the appropriate acid in aqueous medium. 3'-Deoxykanamycin and its pharmaceutically acceptable acid-addition salt may be administered orally, intraperitoneally, intravenously or intamuscularly using any pharmaceutical form known to the art for such administration and in a similar manner to kanamycins. For instance, the compound of this invention may be administered orally using any pharmaceutical form known to the art for such oral administration. Examples of pharmaceutical forms for oral administration are powders, capsules, tablets, syrup, and the like. Suitable dose of the compound for the effective treatment of bacterial infections is in a range of 0.25–2 g. per person a day when it is given orally. It is preferred that said dose should be orally administered in three to four aliquots per day. The compound of this invention may also be administered by intramuscular injection at a dosage of 50–200 mg. per person once or twice a day. Moreover, the compound of the invention may be formulated into an ointment for external application which contains the compound of this invention at a concentration of 0.5–5% by weight in mixture with a known ointment base such as polyethylene glycol.

According to a further aspect of this invention, there is provided a process for the synthesis of 3'-deoxykanamycin, which comprises condensing a 3-deoxysugar derivative of the formula

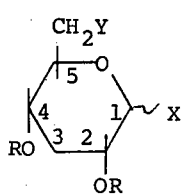

(I)

wherein R is benzyl; X is a halogen atom such as chlorine and bromine; Y is azido group $-N_3$, with a 6-O-(3-amino-3-deoxy-α-D-glucopyranosyl)-2-deoxystreptamine derivative having its functional groups protected represented by the formula

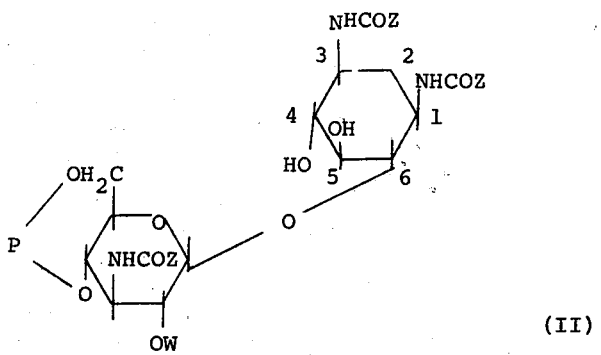

(II)

wherein W is benzyl group; P is an alkylidene group of 2–6 carbon atoms; and Z is an alkyloxy group of 1–4 carbon atoms to produce a condensation product of the formula

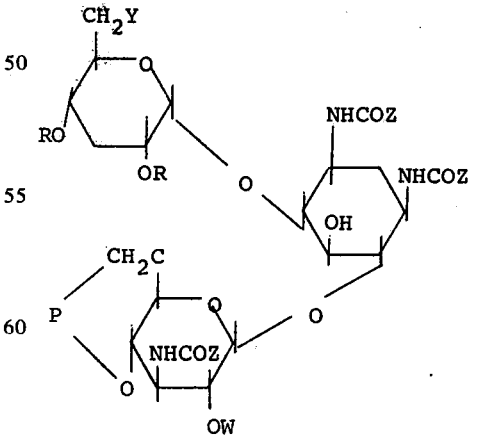

(III)

wherein R, Y, P, W and Z have the same meanings as defined above, catalytically hydrogenating the azido group Y of this condensation product into amino group —NH$_2$, and removing the residual amino-protecting groups and hydroxyl-protecting groups to produce 3'-deoxykanamycin.

In the process of this invention, the condensation of the 3-deoxysugar derivative (I) with the 2-deoxystreptamine derivative (II) may be carried out in a known manner according to the well known Königs-Knorr reaction in an organic solvent such as benzene, dioxane or a mixture thereof. This condensation affords such a condensation product in which the 3-deoxysugar derivative (I) is attached to the 4-hydroxyl group of the deoxystreptamine moiety of the derivative (II) under splitting of the hydrogen halogenide. There is also by-formed such a condensation product in which the 3-deoxysugar derivative (I) is attached to the 5-hydroxyl group of the derivative (II), but this by product may be separated from the main condensation product by chromatography with silica gel using chloroform-acetone as the development solvent.

The azido group Y (—N$_3$) of the main condensation product may then be converted into amino group —NH$_2$ by catalytic hydrogenation with hydrogen in the presence of a platinum metal such as platinum, palladium or of Raney nickel as the catalyst. The benzyl group R which is the well known hydroxyl-protecting group may be removed by a conventional method, for example, by catalytic hydrogenolysis in the presence of a palladium catalyst. Occasionally, the benzyl group R may have been removed during the hydrogenation of the azido group. The alkylidene group —P— is also the well known hydroxyl-protecting group and may be removed by conventional method, for example, by mild hydrolysis with diluted hydrochloride or aqueous acetic acid.

The alkyloxycarbonyl group —COZ where Z is an alkyloxy group as defined in the above is a well-known amino-protecting group and may be removed by a conventional method, for example, by alkaline hydrolysis with aqueous sodium hydroxide or aqueous barium hydroxide. The removal of the alkyloxycarbonyl group —COZ as the amino-protecting radical may, if desired, be effected before the azido group Y is hydrogenated into the amino group. The subsequent removal of all the remaining protective groups from the main condensation product (III) of which the azido group has been reduced into the amino group gives the desired 3'-deoxykanamycin of the formula as shown in the above.

The 3-deoxysugar halogenide derivative of the formula (I) which is used as the starting compound in the present process may be prepared in the following way: Methyl 4,6-0-benzylidene-3-deoxy-α-D-ribohexopyranoside (IV) is at first produced from methyl 4-6-0-benzylidene-2,3-di-0-tosyl- α-D-glucopyranoside and lithium aluminum hydride according to a modified procedure (S. Umezawa, T. Tsuchiya and H. Hineno; "Bull. Chem. Soc., Japan", Vol. 43, p. 1212 (1970) ) of the method of Vis and Karrer (E. Vis and P. Karrer; *Helvetica Chemica Acta*, Vol. 37, p. 378 (1954) ). The compound (IV) so produced is debenzylidenated in aqueous acetic acid to give methyl 3-deoxy-α-D-ribohexopyranoside (V) which is then tosylated preferentially, followed by acetylation to give a 6-0-tosyl-2,4-di-0-acetyl derivative (VI). The tosyl group of the derivative (VI) is then replaced by an azido group —N$_3$ by treating with sodium azido in DMF (dimethylformamide), giving a 6-azido derivative (VII). Deacetylation of the derivative (VII) followed by benzylation with benzyl bromide and barium oxide-barium hydroxide octahydrate in DMF gives a 6-azido-2,4-di-0-benzyl derivative (VIII). Hydrolysis of this derivative (VIII) by refluxing with hydrochloric acid in water-methanol-acetic acid gives 6-azido-2,4-di-0-benzyl-3,6-dideoxy-D-ribo-hexopyranose (IX). This compound (IX) is then halogenated in a usual manner to prepare the 3-deoxysugar derivative (I). For the chlorination, the compound (IX) is treated with thionyl chloride to give 6-azido-2,4-di-0-benzyl-3,6-dideoxy-α-D-ribohexopyranosyl chloride [in the formula (I): X = Cl].

The sequence of the above reactions may be depicted as follows.

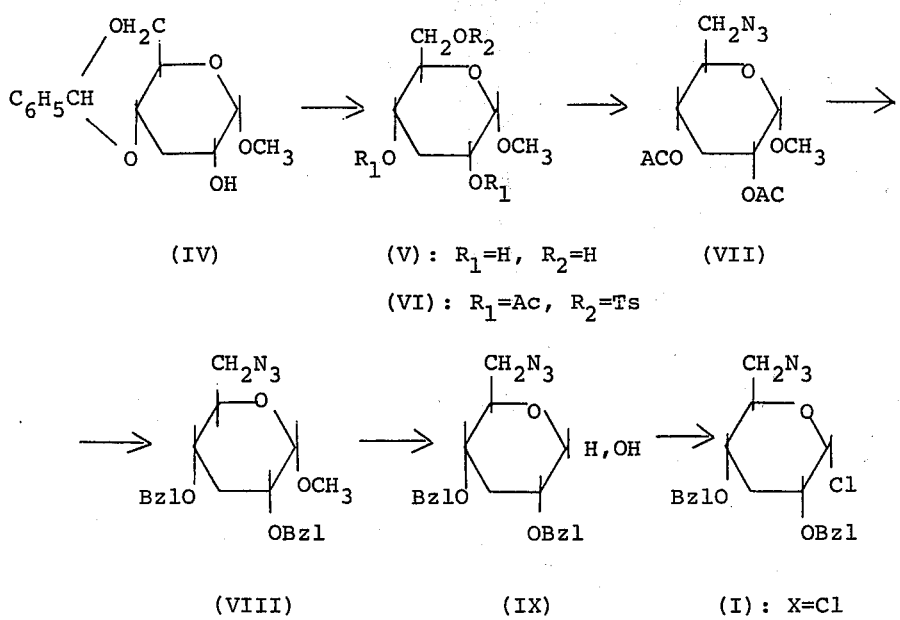

wherein Ac stands for acetyl group —COCH$_3$, Ts tosyl group —SO$_2$C$_6$H$_4$CH$_3$, and Bzl benzyl group —CH$_2$C$_6$H$_5$.

The protected 6-0-(3-amino-3-deoxy-α-D-glucopyranosyl)-2-deoxystreptamine derivative of the formula (II) may be prepared in the following manner: 6-0-(3-amino-3-deoxy-α-D-glucopyranosyl)-2-deoxystreptamine is available by acidic hydrolysis of kanamycins. To prepare the protected derivative (II), 6-0-(3-amino-3-deoxy-α-D-glucopyranosyl)-2-deoxystreptamine is at first reacted with alkyloxycarbonyl halogenide of 2–5 carbon atoms to give a tri-N-alkyloxycarbonylated derivative (X). The 4- and 6-hydroxyl groups of the 3-amino-3-deoxyglucose moiety as well as the 4- and 5-hydroxyl groups of the 2-deoxystreptamine moiety of the N-protected derivative (X) is then alkylidenated in a known manner by treating with an aldehyde or ketone or their simple dialkyl derivative such as 2,2-dimethoxypropane to give a N-protected-di-0-alkylidenated derivative (XI). The 2-hydroxyl group of the 3-amino-3-deoxyglucose moiety of the above-described derivative (XI) is then benzylated in a known manner by treating with benzyl chloride and barium hydroxide in DMF. The 2-0-byzylated derivative so obtained is then treated with a mild acid such as 80% aqueous acetic acid to remove the alkylidene groups, and the dealkylidenation product so obtained is then again alkylidenated using a controlled amount of an alkylidenating agent as described above, to effect a selective introduction of 4,6,-0-alkylidene group into the 3-amino-3-deoxyglucose moiety. In this way, the protected 6-0-(3-amino-3-deoxy-α-D-glucopyranosyl)-2-deoxystreptamine derivative (II) may be prepared.

The invention is now illustrated with reference to the following Examples to which the invention is not limited.

EXAMPLE 1 a. Preparation of 6-azido-2,4-di-0-benzyl-3,6-dideoxy-α-D-ribo-hexopyranosyl chloride [in the formula (I): R = CH$_2$C$_6$H$_5$, Y = N$_3$, X = Cl].

i. Preparation of methyl 3-deoxy-α-D-ribohexopyranoside (Compound 1).

A solution of methyl 4,6-0-benzylidene-3-deoxy-α-D-ribo-hexopyranoside (1.59 g.) (of which preparation is described in the "Bull. Chem. Soc., Japan" Vol. 43, page 1212 (1970) ) in aqueous acetic acid (1:2, 50 ml.) was heated at 100°C for 10 min. The solution was evaporated and the residue was treated with water and ether. After the ether layer was discarded, the aqueous solution was filtered, evaporated and coevaporated with toluene to give a syrup, 1.00 g., [α]$_D^{20}$ + 124° (c 1, water).

ii. Preparation of methyl 2,4-di-0-acetyl-3-deoxy-6-0-tosyl-α-D-ribo-hexopyranoside (Compound 2).

To a cold solution (at −10°C) of Compound 1 (1.61 g.) in dry pyridine (75 ml.), p-toluenesulfonyl chloride (1.81 g.) was added and the mixture was stirred at the temperature for 3 hr. and allowed to stand at 0°C overnight. Thin layer chromatography (ethyl acetate) of the reaction mixture showed three spots corresponding to Compound 1 (Rf 0.21), the monotosyl derivative (Rf 0.55, major) and the ditosyl derivative (Rf 0.93). Acetic anhydride (5.6 ml.) was added and the mixture was allowed to stand at room temperature overnight. The solution was evaporated and the residue was extracted with chloroform. The solution was washed with water, dried over sodium sulfate and evaporated to give a syrup (3.47 g.). Thin lay chromatography (benzene-ethyl acetate 6:1) of the syrup showed three spots of Rf 0.34, 0.45 (major) and 0.57. The syrup was chromatographed on a column of silica gel (100 g.) with benzene-ethyl acetate (5:1) and the fraction containing Compound 2 (360–510 ml., Rf 0.45) was evaporated to give a syrup, 1.47 g. (39%), [α]$_D^{18}$ + 108° (c 1, CHCl$_3$).

Found: C, 52.07; H, 5.92; S, 7.58%. Calcd. for C$_{18}$H$_{24}$O$_9$S: C, 51.91; H 5.81; S, 7.70%.

iii. Preparation of methyl 2,4-di-0-acetyl-6-azido-3,6-dideoxy-α-D-ribo-hexopyranoside (Compound 3).

A mixture of Compound 2 (0.98 g.) and sodium azido (1.6 g.) in dry DMF (40 ml., dried over calcium hydride) was stirred at 145°C for 1.5 hr. The resulting yellow solution was filtered, evaporated, and co-evaporated with toluene to give a syrup. Tlc (benzene-ethyl acetate 6:1) of the syrup showed two spots of Rf 0.55 (major, Compound 3) and 0.45 (Compound 2), the former being orange when sprayed with sulfuric acid. Chromatography with silica gel (100 g.) and the same solvent system gave a pale yellow syrup, 0.51 g. (76%), [α]$_D^{18}$ + 121°C (c 1, CHCl$_3$).

Found: C, 46.07; H, 6.03; N, 14.65%. Calcd. for C$_{11}$H$_{17}$N$_3$O$_6$: C, 45.99; H, 5.97; N, 14.62%.

iv. Preparation of methyl 6-azido-2,4-di-0-benzyl-3,6-dideoxy-α-D-ribo-hexopyranoside (Compound 4).

To a solution of Compound 3 (0.51 g.) in methanol (10 ml.), a piece of sodium metal was added and subsequent procedures were carried out in a usual manner; a pale yellow syrup, 0.30 g. (84%), [α]$_D^{18}$ + 142° (c 1, CHCl$_3$) was obtained. This syrup material (0.57 g.) was dissolved in DMF (12 ml.), and to this solution, powdered barium oxide (2.2 g.) and powdered barium hydroxide octahydrate (4.6 g.) were added and to the suspension, benzyl bromide (5 ml.) was stirred in dropwise under vigorous stirring at room temperature and the mixture was agitated overnight. Chloroform (80 ml.) was added and the mixture was filtered through a layer of celite. The filtrate was evaporated and co-evaporated with toluene to give a syrup, which showed four spots of Rf 0.80 (Compound 4, major), 0.20 (slight), 0.05 (slight) and 0 (slight) on thin layer chromatography with benzene-ethyl acetate (10:1). The syrup was chromatographed on a short column of silica gel (30 g.) with the same solvent system and the fraction containing Compound 4 was collected and evaporated to give a pale yellow syrup, 0.87 g. (81%), [α]$_D^{19}$ + 90° (c 1, CHCl$_3$).

Found: C, 65.84; H, 6.49; N, 10.99%. Calcd. for C$_{21}$H$_{25}$N$_3$O$_4$: C, 65.78; H, 6.57; N, 10.96%.

v. Preparation of 6-azido-2,4-di-0-benzyl-3,6-dideoxy-D-ribo-hexopyranose (Compound 5).

To a solution of Compound 4 (0.51 g.) in acetic acid (18 ml.), 2N hydrochloric acid in 50% aqueous methanol (6 ml.) was added and the solution was refluxed for 1.5 hr. After neutralization with sodium hydrogen carbonate, the solution was filtered, and the filtrate was evaporated to give a residue. The chloroform solution of the residue was washed with water, dried over sodium sulfate and evaporated to give a syrup, which, on thin layer chromatography with benzene-ethyl acetate (10:1), showed three spots of Rf 0.80 (Compound 4, minor), 0.40 (Compound 5, major) and 0.0. The syrup was chromatographed on a short column of silica gel with the same solvent system and the fraction containing Compound 5 was collected and evaporated to give a pale yellow syrup, 0.37 g. (75%), $[\alpha]_D^{18} + 75°$ (c 1, CHCl$_3$; the final value).

Found: C, 64.90; H, 6.61; N, 11.12%. Calcd. for C$_{20}$H$_{23}$N$_3$O$_4$: C, 65.02; H, 6.28; N, 11.38%.

vi. Preparation of 6-azido-2,4-di-0-benzyl-3,6-dideoxy-α-D-ribo-hexopyranosyl chloride (Compound 6).

To ice-cold thionyl chloride (5 ml.), Compound 5 (197 mg.) was added gradually and the solution was allowed to stand in the cold for 1 hr. and then at room temperature overnight. The solution was coevaporated with dry toluene in vacuo and the residue was dissolved in dry benzene. The solution was passed through a short column of silica gel (3 g.), which was preactivated at 120°C in vacuo for 5 hr. before use. The eluate containing Compound 6 was collected and evaporated to give a pale yellow syrup, 125 mg. (61%), $[\alpha]_D^{20} + 170°$ (c 1, CHCl$_3$).

Found: C, 62.14; H, 5.98; N, 11.07; Cl, 9.61%. Calcd. for C$_{20}$H$_{22}$N$_3$O$_3$Cl: C, 61.93; H, 5.72; N, 10.83; Cl, 9.14%.

b. Preparation of 6-0-(2-0-benzyl-3-deoxy-3-ethoxycarbonylamino-4,6-0-isopropylidene-α-D-glucopyranosyl)-N,N'-diethoxycarbonyl-2-deoxystreptamine [in the formula (II): W = CH$_2$C$_6$H$_5$, Z = OC$_2$H$_5$, P = > CH(CH$_3$)$_2$].

i. Preparation of N,N'-Diethoxycarbonyl-6-0-(3-deoxy-3-ethoxycarbonylamino-α-D-glucopyranosyl)-2-deoxystreptamine (Compound 7).

To a solution of 6-0-(3-amino-3-deoxy-α-D-glucopyranosyl)-2-deoxystreptamine (5.52 g.) and anhydrous sodium carbonate (5.30 g.) in water (55 ml.), acetone (55 ml.) was added with vigorous stirring and to the suspension, ethyl chloroformate (5.8 g.) was added all at once. An almost clear solution was soon formed with evolution of gas, after that precipitates appeared. Regardless of precipitation, agitation was continued for 18 hr. at room temperature. Thin layer chromatography (benzene-methyl ethyl ketone 4:1) of the reaction mixture showed a single spot (Rf 0.4). After addition of 2N hydrochloric acid (22 ml.), the reaction mixture was evaporated in vacuo. The residue was then suspended in DMF (200 ml.), filtered from an insoluble matter and the filtrate was evaporated with several additions of toluene. The resultant residue was dissolved in DMF (40 ml.) and worked up again as above. The desalted residue was boiled with ethanol (150 ml.) for a while, cooled, and the insoluble product was taken by filtration; 7.50 g. (82%), mp>250°C, $[\alpha]_D^{20} + 64°$ (c 1, DMF).

Found: C, 47.01; H, 7.12; N, 7.83%. Calcd for C$_{12}$H$_{37}$O$_{13}$: C, 46.75; H, 6.91; N, 7.79%.

ii. Preparation of N,N'-diethoxycarbonyl-6-0-(3-deoxy-3-ethoxycarbonylamino-4,6-0-isopropylidene-α-D-glucopyranosyl)-4,5-0-isopropylidene-2-deoxystreptamine. (Compound 8).

To a solution of well dried Compound 7 (973 mg.) in dry DMF (dried over calcium hydride), dehydrated p-toluenesulfonic acid (30 mg., dried in vacuo at 100°C in the presence of P$_2$O$_5$) and 2,2-dimethoxypropane (1.4 ml.) were added, and the mixture was allowed to stand for 5 hr. at 40°C.

After treatment with a strongly basic anion-exchange resin essentially consisting of a polystyrene containing quaternary ammonium groups —N—(CH$_3$)$_3$OH as the functional groups (commercially available under a trade name "Amberlite" IRA 400, a product of Rohm & Haas Co., U.S.A.). (OH form, 2 ml.) resin, the mixture was filtered and the filtrate was evaporated with several additions of toluene to give a thick syrup (1.06 g.). Purification was accomplished by dissolving the syrup in methanol-ethanol (1:1) with subsequent addition of petroleum ether; a colorless solid (940 mg., 84%), mp. 237°–238°C, $[\alpha]_D^{20} + 41°$ (c 1, pyridine).

Found: C, 52.23; H, 7.55; N, 6.81%. Calcd for C$_{27}$H$_{45}$O$_{13}$N$_3$: C, 52.33; H, 7.32; N, 6.78%.

iii. Preparation of 6-0-(2-0-benzyl-3-deoxy-3-ethoxycarbonylamino-4,6-0-isopropylidene-α-D-glucopyranosyl)-N,N'-diethoxycarbonyl-4,5-0-isopropylidene-2-deoxystreptamine (Compound 9).

To a mixture of Compound 8 (102 mg.), powdered barium oxide (62 mg.) and powdered barium hydroxide octahydrate (123 mg.) in DMF (2 ml.), benzyl chloride (0.14 ml.) was added and the suspension was agitated vigorously for 1 hr. at room temperature. Thin layer chromatography (benzene-methanol 5:1) of the reaction mixture showed that the starting material (Rf 0.52) disappeared and instead, a new spot (Rf 0.70) appeared. The suspension was filtered with the aid of chloroform (20 ml.) and the filtrate was evaporated with several additions of toluene. The chloroform solution of the resultant residue was washed with saturated sodium bicarbonate solution, then with water, dried over sodium sulfate and concentrated. Addition of petroleum ether afforded a colorless solid (112 mg., 96%), which was recrystallized from methanol, mp. 286°C, $[\alpha]_D^{20} + 47°$ (c 1, pyridine).

Found: C, 57.20; H, 7.44; N, 5.81%. Calcd for C$_{34}$H$_{51}$O$_{13}$N$_3$: C, 57.53; H, 7.24; N, 5.92%.

iv. Preparation of 6-0-(2-0-benzyl-3-deoxy-3-ethoxycarbonylamino-α-D-glucopyranosyl)-N,N'-diethoxycarbonyl-2-deoxystreptamine (Compound 10).

A suspension of Compound 9 (3.36 g.) in 80% aqueous acetic acid (100 ml.) was heated for 10 min. at 80°C. Thin layer chromatography (benzene-methanol 5:2) of the solution showed that the starting material (Compound 10 Rf 0.80) disappeared and instead, Compound 11 (Rf 0.58) appeared as a sole product. The solution was evaporated with several additions of toluene-methanol. The resultant residue was dissolved in methanol, and the solution was treated with Amberlite IRA-400 (OH form), then with active charcoal. Concentration of the solution to about 100 ml. followed by cooling gave a colorless crystals (2.58 g., 87%), mp. 149°C, $[\alpha]_D^{15} + 77°$ (c 1, pyridine).

Found: C, 53.15; H, 6.93; N, 6.53%. Calcd for C$_{28}$H$_{43}$O$_{13}$N$_3$: C, 53.41; H, 6.88; N, 6.67%.

v. Preparation of 6-0-(2-0-benzyl-3-deoxy-3-ethoxycarbonylamino-4,6-0-isopropylidene-α-D-glucopyranosyl)-N,N'-diethoxycarbonyl-2-deoxystreptamine (Compound 11).

To an ice-cold solution of well dried Compound 10 (1.76 g., 2.8 mmol.) in dry DMF (35 ml., dried over calcium hydride), dehydrated p-toluenesulfonic acid (24 mg.) and 2,2-dimethoxypropane (1.46 g., 14 mmol.) were added and the mixture was allowed to stand for 3 hr. at 0°C. After treatment with methonal-washed Amberlite IRA-400 (OH form), the mixture was filtered and the filtrate was evaporated with several additions of toluene to give a colorless powder (1.8 g.). Since the powder had only very limited solubility against the solvent systems tested, several attempts to separate the components by column chromatography, however, were unsuccessful. The suspension of the powder (1.8 g.) in benzene (60 ml.) was resluxed for 15 min., cooled and filtered. The insoluble material was treated with warm chloroform and an insoluble part was removed. The chloroform-soluble portion (1.28 g.) was then dissolved in dioxane (15 ml.) and the solution was diluted with petroleum ether (100 ml.) to give pure Compound 11 (1.12 g., 60%), mp. 263°C, $[\alpha]_D^{20} + 54°$ (c 1, pyridine).

Found: C, 55.12; H, 7.14; N, 6.15%. Calcd for $C_{31}H_{47}O_{13}N_3$: C, 55.60; H, 7.07; N, 6.27%.

EXAMPLE 2

(a) Production of 6'-azido-2',2'',4'-tri-O-benzyl-3'-deoxy-4'',6''-O-isopropylidene-N,N',N''-triethoxycarbonylkanamycin [in the formula (III), R=W=$CH_2C_6H_5$, Y=$N_3$, Z=$OC_2H_5$, P=CH $(CH_3)_2$].

6-Azido-2,4-di-O-benzyl-3,6-dideoxy-α-D-ribohexopyranosyl chloride [in the formula (I), R=$CH_2C_6H_5$, X=Cl, Y=$N_3$] (0.4 g.) and 6-O-(2-O-benzyl-3-deoxy-3-ethoxycarbonylamino-4,6-O-isopropylidene)-N,N'-diethoxycarbonyl-2-deoxystreptamine [in the formula (II), W=$CH_2C_6H_5$, Z=$OC_2H_5$, P=$(CH(CH_3)_2$9 (0.45 g.) were dissolved in a mixture of dry benzene-dioxane (3:1, 16 ml.) and the solution, after addition of mercuric cyanide (0.6 g.), was refluxed. After 6 hour's reaction, another amount of mercuric cyanide (1 g.) was added and the mixture was refluxed for further 10 hours. The reaction mixture was filtered and the residue was washed with chloroform. The filtered solution and the washings combined were washed with water, dried over anhydrous sodium sulfate and evaporated to give a syrup (0.95 g.), which was then chromatographed on a column of silica gel with chloroform-acetone (5:1). The fraction containing a substance showing Rf 0.5 on thin-layer chromatogram of silica gel with the same solvent mixture, was evaporated to give a solid (0.25 g.), mp. 263°–264°C, $[\alpha]_D^{20} + 97°$ (c 0.9, pyridine); IR spectrum: 2100 $cm^{-1}(N_3)$. Found: C, 59.79; H, 6.76; N, 7.91%. Calcd for $C_{51}H_{68}N_6O_{16}$: C, 59.98; H, 6.71; N, 8.23%.

b. Synthesis of 3'-deoxykanamycin.

The condensation product (0.82 g.) produced by the above procedure of Example 2(a) was dissolved in 80% aqueous acetic acid (20 ml.) and the solution was heated at 90°C for 5 minutes. The reaction mixture was poured into water and the resulting precipitates were filtered and dried to give a solid (0.79 g.). This deisopropylidenated product was dissolved in a hot mixture of ethanol-p-dioxane (5:1, 120 ml.) and the solution was hydrogenated with hydrogen under 1 atm. pressure in the presence of 0.5 g. of Raney nickel (T-4) at 45°C for 4 hours to reduce the azide group into amino group. The reaction mixture was filtered and evaporated to give a solid (0.6 g.). This hydrogenation product which had no azide group, was then dissolved in ethanol-water (8:1, 90 ml.) containing small amount of acetic acid and the solution was hydrogenated with hydrogen under 1 atm. pressure in the presence of palladium black at 45°C for 10 hours. The reaction mixture was filtered and evaporated to give a solid (0.3 g.). This debenzylated product, which structure was proved by IR and NMR spectra, was heated with 1N barium hydroxide (10 ml.) at 90°C for 9 hours to remove the ethoxycarbonyl groups. Carbon dioxide was introduced and, after filtration of the resulting precipitate, the solution was concentrated. The concentrated solution was charged on a column of a cation-exchange resin essentially consisting of a copolymer of methacrylic acid with divinylbenzene in the form of the ammonium salt (commercially available under a registered trade name "Amberlite" IRC 50, a product of Rhom & Haas Co, U.S.A.) and developed with 0.3 N ammonium hydroxide. The fraction containing a substance showing $Rf_{kanamycin}$ 2.2 on thin-layer chromatogram with n-butanol-pyridinewater-acetic acid (6:4:3:1) was collected and concentrated. Addition of acetone gave 3'-deoxykanamycin (90 mg.), $[\alpha]_D^{20} + 146°$ (c 0.2, water); Found: C, 46.10; H, 7.70%. Calcd. for $C_{18}H_{36}N_4O_{10}$: C, 46.14; H, 7.75%.

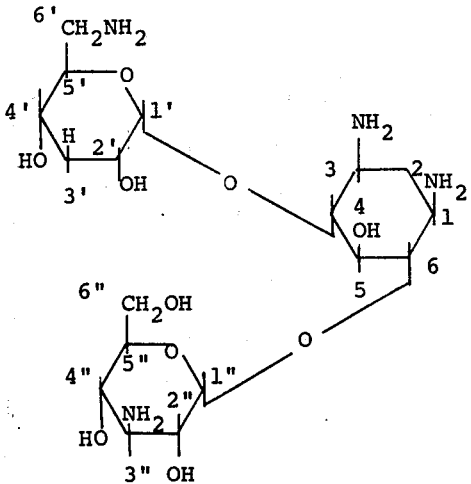

What we claim is:
1. 3'-Deoxykanamycin of the formula